No. 866,153. PATENTED SEPT. 17, 1907.
L. W. MILLER.
COMBINED IRONING BOARD, CHEST, AND TABLE.
APPLICATION FILED DEC. 31, 1906.
2 SHEETS—SHEET 1.
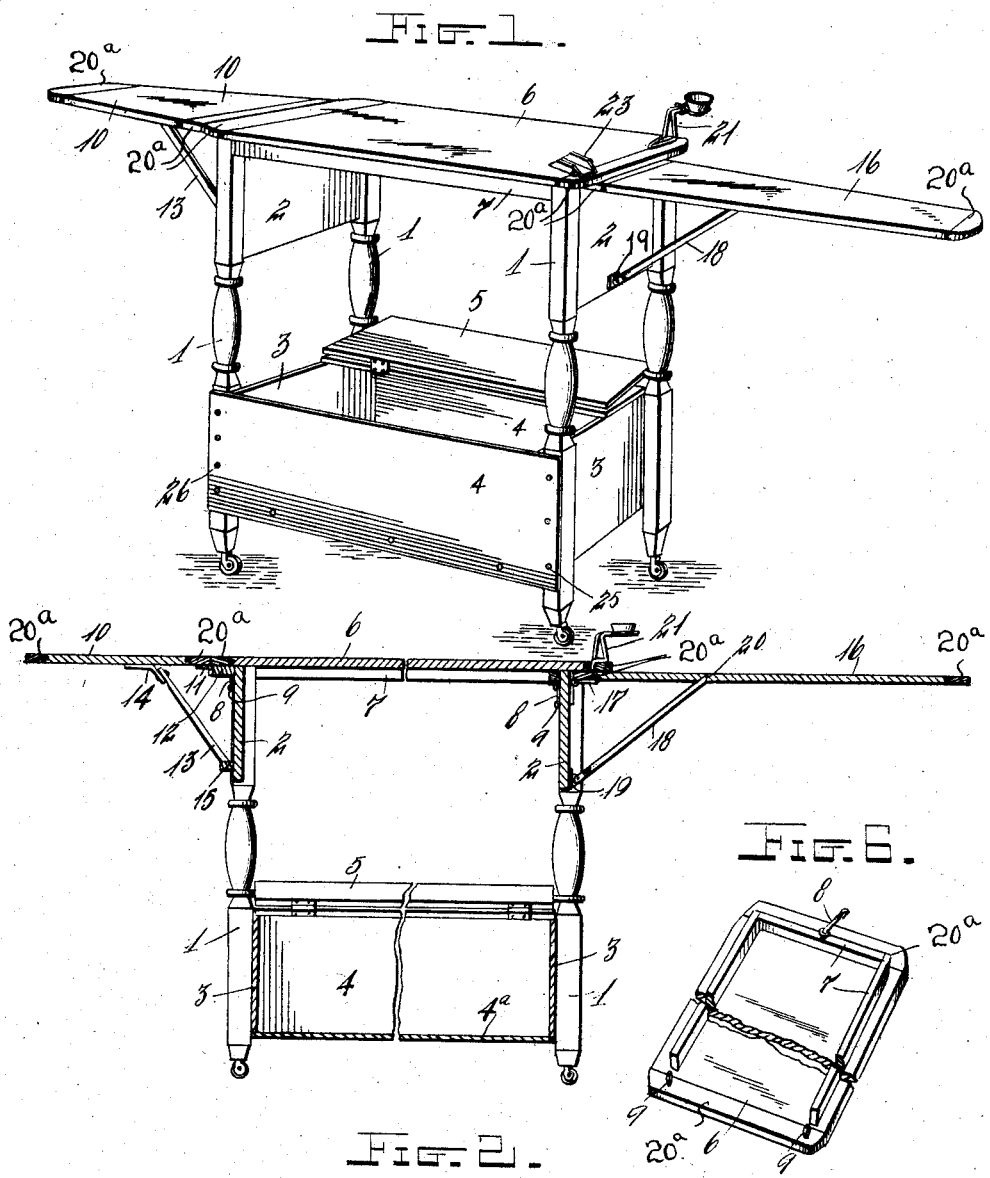

No. 866,153. PATENTED SEPT. 17, 1907.
L. W. MILLER.
COMBINED IRONING BOARD, CHEST, AND TABLE.
APPLICATION FILED DEC. 31, 1906.

2 SHEETS—SHEET 2.

Witnesses
Inventor
L. W. Miller
by
Attorneys

UNITED STATES PATENT OFFICE.

LEWIS W. MILLER, OF RUSSELLVILLE, ARKANSAS.

COMBINED IRONING-BOARD, CHEST, AND TABLE.

No. 866,153.   Specification of Letters Patent.   Patented Sept. 17, 1907.

Application filed December 31, 1906. Serial No. 350,159.

To all whom it may concern:

Be it known that I, LEWIS W. MILLER, a citizen of the United States, residing at Russellville, in the county of Pope and State of Arkansas, have invented certain new and useful Improvements in a Combined Ironing-Board, Chest, and Table; and I do declare the following to be a full, clear, and exact description of the invention, such as will enable others skilled in the art to which it appertains to make and use the same.

This invention relates to a combined ironing board, chest and table.

The object of the invention is to provide a household article embodying the above-named features, which shall be simple, compact and ornamental in character, will require but comparatively small amount of stock in its construction, and will be adapted readily to be set up for use, or knocked down for transportation, the latter to economize space and thus materially reduce the cost of shipping.

With the above and other objects in view, as will appear as the nature of the invention is better understood, the same consists in the novel construction, combination and arrangement of parts of a combined ironing board, chest and table, as will be hereinafter fully described and claimed.

Figure 3:
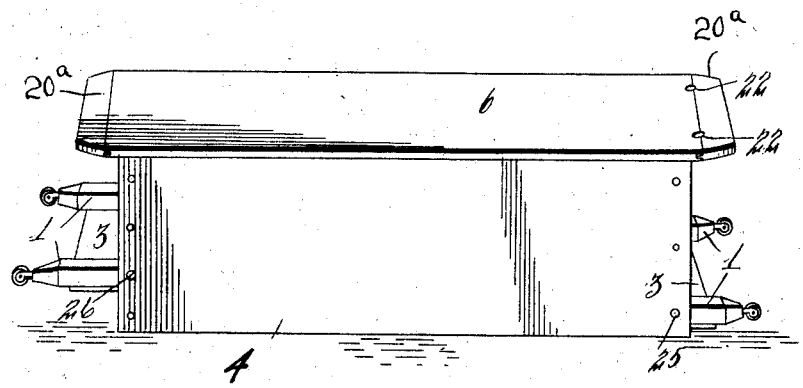
Figures 7, 8:
Figure 5:
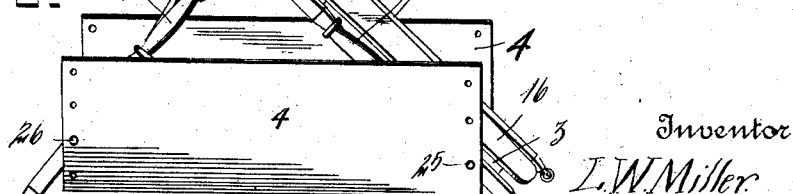

In the accompanying drawings forming a part of this specification, and in which like characters of reference indicate corresponding parts,—Figure 1 is a view in perspective of an article of the character specified, exhibiting the same as it appears when set up for use; Fig. 2 is a vertical longitudinal sectional view through the article; Fig. 3 is a view in perspective of the article as it appears when knocked down; Fig. 4 is a view in vertical longitudinal section, exhibiting the manner of disposition of the parts when the article is knocked down. Fig. 5 is a perspective view, exhibiting the manner in which the folding or knocking down of the parts is effected; Fig. 6 is a perspective detail view, viewed from the under side, of the main ironing board; Fig. 7 is a view in perspective of a lamp stand adapted for use in connection with the main ironing board; and Fig. 8 is a similar view of an iron rest for use in connection with the same element.

The article embodies four legs 1, which may be ornamented in any preferred manner, each pair being connected at its upper ends by a cross piece 2 that is by preference mortised into the standards, thus to insure a rigid structure. The lower portion of each pair of standards is connected and rendered rigid by the cross pieces 3 that constitute the end walls of a chest, and are herein shown as secured to the opposed faces of the standards, merely for the purpose of improving the general appearance of the article, but if preferred they may be secured to the exterior faces thereof and still be within the scope of the invention. The chest embodies further side walls 4 and a bottom 4ª, the side walls being disposed exteriorly of the standards and secured thereto in any preferred manner, as by a plurality of screws. This chest, when the article is set up, as shown in Fig. 1, will form a convenient receptacle for storing clothing or the like, and will be found of value for this purpose. To close the chest, a two-part cover 5 is provided, the sections of which are connected by hinges, thus to permit ready access to the interior of the chest. By preference, this cover is freely detachable from the chest, thus to permit it to be housed within the same when the structure is knocked down, as shown in Fig. 4, wherein the position of the other parts of the article, under these conditions, is clearly displayed. To facilitate moving the article from point to point, the standards are herein shown as provided with ordinary casters, but this is not essential and may be omitted if preferred.

Supported by the standards is a main ironing board 6, the under side of which is reinforced against warping by suitable battens 7. It will by preference be mortised into the board. When the article is set up, as shown in Fig. 1, this board, as stated, constitutes the main ironing surface; but when the article is knocked down as shown in Fig. 3, this board constitutes the lid of the chest, and will also subserve the function of a table, upon which any article may rest. In order to hold the board 6 combined with the standards, a plurality of hooks 8 and eyes 9 are provided, the hooks being designed to engage with eyes carried by the standards or cross pieces, and the eyes by hooks carried by the standards or cross pieces, as shown in Fig. 2. While it is preferred to employ hooks and eyes for the purpose stated, it will be understood that any other suitable form of assembling means may be employed for this purpose, if found necessary or desirable.

To extend the ironing surface of the main board, and also to adapt it for use in ironing various articles of wearing apparel that have to be slipped onto the board, there is a supplemental ironing board 10 provided, which as shown in Fig. 1, is tapered in form, and is connected by hinges 11 with a batten or ledge 12 secured to the cross piece at that end of the article. To hold the board 10 in horizontal position, and to enable it to resist the pressure to which it will be subjected in use, against yielding, there is a brace 13 provided, which is pivotally connected with a bracket 14 secured to the under side of the board 10, and engages at its free end with a ledge or projection 15 carried by the cross piece.

At the end of the structure opposite the board 10 there is a second supplemental ironing board 16 provided, which is narrower and is adapted more particularly for use in pressing trouser legs, coat sleeves and the like. This board occupies a plane below the upper face of the board 6, and is hingedly connected with the cross piece by hinges 17. To hold this latter board against sagging in use, a brace 18 is provided, the lower end of which is pivotally connected with a bracket 19 secured to the cross piece, and the upper end of which engages a notch 20 in the under side of the board. In order to prevent the main and supplemental ironing boards from warping, terminal battens or cross-pieces 20ª are employed that are tongued into the respective boards, as clearly shown.

To extend the range of usefulness of the article, there is provided a novel form of lamp stand 21, shown in Fig. 7, which is by preference constructed of wire bent to the appropriate shape to grasp a lamp, cup, basin or the like, and being provided with a reduced shank 21 to engage one of a pair of openings 22 in the board 6. There is also provided an iron rest 23, shown in Fig. 8, which is constructed of sheet metal bent to the appropriate shape, and has combined with it a shank 24 to engage one of the openings 22 in the board 6.

When the article is to be knocked down for any purpose, the cover 5 of the chest is removed, and all of the screws at the right-hand end of the article except that designated 25 and all those at the left-hand end of the article except that designated 26, are removed, the remaining pair of screws at each end of the article forming pivots about which the standards can turn, as shown in Fig. 5. The board 6 is then detached by releasing the hooks, and the braces 13 and 18 are released to permit the boards 10 and 16 to fold down between the respective standards. The standards at the right-hand end of the article are then folded in upon the bottom of the chest, and the standards at the left-hand end of the article are folded over the first-named standards as shown in Fig. 4, after which the cover 5 is placed within the chest, and the board 6 is finally positioned as shown.

By the manner of constructing and combining the parts, when the article is knocked down, it occupies but small space and may thus be readily shipped at a slight expense and without danger of injury to the parts. Moreover, as no unnecessary stock is employed in the construction of the article, it may be manufactured at low cost and without the necessity of special machinery for the purpose.

Having thus described my invention, what I claim as new and desire to secure by Letters-Patent, is:—

A knocked down article of the class described, comprising standards, a chest to which the standards are pivotally secured, a main ironing board detachably connected with the standards, and constituting a chest cover when the article is knocked down, and supplemental ironing boards combined with the standards and foldable thereon, thereby to be housed within the chest when the main ironing board is in position thereon.

In testimony whereof I have hereunto set my hand in presence of two subscribing witnesses.

LEWIS W. MILLER.

Witnesses:
CHARLES J. WEBB,
VERNON E. SHINN.